United States Patent [19]
Rolando et al.

[11] Patent Number: 5,797,986
[45] Date of Patent: Aug. 25, 1998

[54] FLOOR CLEANING METHOD

[75] Inventors: John J. Rolando, Woodbury; Terry J. Klos, Victoria, both of Minn.; John E. Thomas, River Falls, Wis.; David W. Gohl, St. Paul, Minn.; Allison Buchanan, Biloxi, Miss.

[73] Assignee: Ecolab Inc., St. Paul, Minn.

[21] Appl. No.: 749,076

[22] Filed: Nov. 14, 1996

Related U.S. Application Data

[63] Continuation of Ser. No. 382,293, Feb. 1, 1995, abandoned.

[51] Int. Cl.$^6$ .................................................. B08B 3/04
[52] U.S. Cl. ........................... 134/6; 134/27; 134/28; 134/29; 134/40; 510/214; 510/217; 510/238; 510/239; 510/240
[58] Field of Search ................... 134/27, 28, 29, 134/40, 6; 510/214, 217, 238, 239, 240

[56] References Cited

U.S. PATENT DOCUMENTS

| | | | |
|---|---|---|---|
| Re. 32,818 | 1/1989 | Fernholz et al. | 252/90 |
| T102,902 | 4/1983 | Khasawneh | 71/29 |
| 3,042,621 | 7/1962 | Kirschenbauer | 134/27 |
| 3,511,707 | 5/1970 | La Flamme | 134/27 |
| 3,816,351 | 6/1974 | Lancz | 252/527 |
| 4,175,943 | 11/1979 | Jordaan et al. | 71/29 |
| 4,260,592 | 4/1981 | Corver et al. | 423/305 |
| 4,587,030 | 5/1986 | Casey | 252/92 |
| 4,595,520 | 6/1986 | Heile et al. | 252/160 |
| 4,624,713 | 11/1986 | Morganson et al. | 134/25.2 |
| 4,680,134 | 7/1987 | Heile et al. | 252/160 |
| 4,683,008 | 7/1987 | Betts | 134/27 |
| 4,734,138 | 3/1988 | Ely et al. | 134/27 |
| 4,749,508 | 6/1988 | Cockrell, Jr. et al. | 252/136 |
| 4,769,159 | 9/1988 | Copeland | 252/8.8 |
| 4,877,459 | 10/1989 | Cockrell, Jr. et al. | 134/40 |
| 5,198,198 | 3/1993 | Gladfelter et al. | 422/264 |
| 5,223,168 | 6/1993 | Holt | 252/142 |
| 5,310,549 | 5/1994 | Bull | 424/78.08 |
| 5,358,653 | 10/1994 | Gladfelter et al. | 252/90 |
| 5,364,551 | 11/1994 | Lentsch et al. | 252/156 |
| 5,427,627 | 6/1995 | Canestaro et al. | 134/29 |

FOREIGN PATENT DOCUMENTS

| | | |
|---|---|---|
| WO 91/18046 | 11/1991 | WIPO. |
| WO 94/22601 | 10/1994 | WIPO. |

*Primary Examiner*—Zeinab El-Arini
*Attorney, Agent, or Firm*—Merchant, Gould, Smith, Edell, Welter & Schmidt, P.A.

[57] ABSTRACT

The hard floor surface in common food preparation sites can have complex soils that are difficult to remove. Such floor can have two surface qualities. A first surface contains an array of quarry tile. The second surface contains a grid of grout lines surrounding the tile completing the surface. Each surface provides particular soil removal problems. We have found a unique product sequence, used in a method for cleaning hard surface or hard quarry tile floors, that is surprisingly effective in removing soil from both the floor tile surface and grout lines. The resulting clean floor surface maintains a clean quarry tile surface, a white new appearing grout line having no substantial build-up of soil residue. The floors obtain a clean, slip-free surface that is clean, sanitized, and has improved safety from slip and fall accidents.

42 Claims, 4 Drawing Sheets

FLOOR CLEANING METHOD

This is a Continuation of application Ser. No. 08/382,293, filed Feb. 1, 1995, now abandoned.

FIELD OF THE INVENTION

The invention relates to methods of soil removal from soiled, slippery hard surface floors. The invention also relates to soil removal or a method of cleaning a quarry tile floor having a surface comprising grouted quarry tile. A unique application sequence of cleaner products results in the removal of a complex soil comprising a mixture of two or more of a large variety of soils including organic soils derived from cleaning products, an inorganic soil, a largely alkaline soil, a protein soil, a carbohydrate soil and a fatty soil including neutral fat or a fatty acid or salt thereof material from both grout and tile surfaces. The unique methods of the invention involves the sequential application of cleaning material to a floor surface combined with mechanical soil removal including an abrasion, or abrasive cleaning step, of the floor surface in the presence of the cleaning material. The floor can be restored to a substantially soil-free, non-skid condition as characterized by coefficient of friction (COF) or FTIR (Fourier Transform Infrared Analysis).

BACKGROUND OF THE INVENTION

Typical food preparation units, in restaurants, hotels, cafeterias, etc., typically have floors with hard surfaces. Preferred surfaces comprise a grouted quarry tile surface. Such tile floors are often installed by embedding quarry tile into a fixative or adhesive base to provide a secure foundation for the tile. The tile is installed with joints in a grid-like pattern surrounding the tiles. The joints are then filled with a cement-like material called grout. As a result, such a floor surface comprises an array of quarry tile and a grout line, surrounding each quarry tile, in a grid-like pattern.

The food preparation unit can generate a variety of soil. Food preparation involves proteinaceous, fatty and carbohydrate type materials. Food preparation units are also exposed to soils from the environment and from aqueous cleaners comprising a combination of water hardness and cleaner components. Such food materials and soils can form soil deposits on floor surfaces. The fatty soil can comprise typically two forms, i.e. a neutral fatty soil, which can comprise, for example, substantially a neutral fatty acid triglyceride ester and similar neutral fats, and free fatty acid or salts thereof. The fatty acid salts can be formed from a sodium, calcium, magnesium, ferric, ferrous, etc. cation.

A large body of cleaners and cleaning methods have been developed in the prior art. In large part, the prior art shows a large number of basic and neutral cleaners with relatively fewer acidic cleaners. The vast spectrum of potential soil blends and soil types forming soil deposits on the floor can pose a significant cleaning challenge. No single cleaner can effectively remove all soils. Cleaning materials that clean neutral fatty soils may be less effective in removing inorganic soils. Cleaning materials that remove free fatty acid soils may be ineffective in removing proteinaceous soil.

Contaminated or soiled hard surface flooring, or quarry tile, has been a problem in the institutional or hospitality industry for many years. Soiled floor surfaces can be a reservoir for harmful bacteria, can be a slip and fall hazard and can generally be aesthetically unattractive. Typical kitchen floor soils comprise various components including saturated and unsaturated fatty material (neutral fatty esters), fatty acid, fatty acid salts (of sodium, calcium, magnesium, etc.), protein, carbohydrate, mineral, generally from service water hardness components, cleaner residue, dirt and grime and other components derived from the local environment. The soil compositions vary from location to location depending on menu, cleaning procedures, cleaning chemicals, service water hardness, cleaning, the timing of a cleaning protocol, types of procedures and other characteristics. In addition, soils that form on grout lines or grout surfaces may substantially differ in composition from soils that form on quarry tile surfaces. We have found that soils on grout or on a grout line can contain substantially more mineral and fatty acid components than soils present on quarry tile surfaces.

Floor geometry can also have an impact on cleaning. Grout lines are typically vertically recessed from the surface of the quarry tile. The difference in position, comparing the quarry tile surface to the grout line, results in substantially different environments for soil build-up. Soils are typically protected in grout lines by the recessed nature of the grout installation during floor construction. The surface of the quarry tile is more exposed to the action of mechanical abrading cleaning processes. The recessed nature of the grout lines provides, in particular at the periphery of the grout line next to the quarry tile, a protected area or recessed reservoir for soil build-up. The soil build-up on the grout line will comprise materials that naturally accumulate in the grout line combined with materials that are removed from the quarry tile surface and placed in the grout line during maintenance operations. The resulting complex soil deposit and floor surface geometry can pose a difficult problem for maintenance personnel. The soils on the surface of a quarry tile are different than the soils commonly accumulating on the grout line. Additionally, soils in a soft water location will be substantially different than soils in a hard water location, and soils in an institutional setting serving a fatty menu will have soils substantially different than soils derived in a location serving a more healthful low fat menu.

A large number of cleaning protocols are shown in the prior art. Floor maintenance often entails only a cleaning step. However, more typical hard surface floor cleaning protocols involve a "maintenance" step and a "stripping" step. A maintenance step is performed routinely, often daily or twice daily, in a less intensive cleaning method to remove daily build-up of soil. The "stripping" procedure is an intensive procedure in which the floor is cleaned to ensure that the floor is substantially free of soil or other contamination. Stripping processes involve a concentrated application of cleaners and a careful abrasion of the surface of the floor to ensure that all soils are removed. The maintenance protocol between stripping steps attempts to reduce the build-up of soil between stripping steps using less concentrated materials and less rigorous cleaning methods. However, some complex soils resist even an aggressive stepping protocol. A single neutral cleaner comprising an aqueous nonionic surfactant, designed for a soil comprising neutral protein and fat will work poorly on a fatty acid soil and worse on a fatty acid soil combined with hardness components. Similarly, a single step basic cleaner or a single step acidic cleaner can fail to clean a floor. In large part, cleaning materials suggested for cleaning hard surfaces and quarry tile in institutional settings with complex soils have typically comprised either a neutral or a basic cleaner used in a single step. While these types of cleaners tend to be partially effective on neutral fatty soils or inorganic largely alkaline soils, the cleaners and protocols using such cleaners have failed to successfully remove the complex soils formed on quarry tile surfaces and in grout lines even when used in a stepping step with substantial mechanical action.

Acidic cleaners have also been attempted. Cockrell, Jr. et al., U.S. Pat. Nos. 4,749,508 and 4,877,459 each teach the use of acidic materials in removing quarry tile soil. We have found that the acidic cleaners in Cockrell, Jr. et al. have merit in removing fatty soils or fully acid soils having some substantial proportion of inorganic hardness components. The Cockrell, Jr. et al. materials are acid cleaners, are applied to hard surfaces, and are used with substantial abrasion to remove the underlying soil from hard surfaces. We have found that some complex soil types are not substantially removed using the acid cleaners of Cockrell, Jr. et al.

We have found that the complex nature of the soil formation can result in soil types that resist acid cleaning. None of the available cleaners can be used in a single step to remove soil from a majority of locations. As discussed above, varying proportions of protein based soils, carbohydrate based soils, differing proportions of free fatty acid soil and neutral fatty acid soils, dirt, cleaner residue, etc. all combined with substantial amounts of hardness components from service water, can result in a soil that is resistant to cleaning by typical acidic or basic cleaning protocols when used alone in a typical stripping or maintenance procedure.

A substantial need exists in developing an effective cleaning protocol that can successfully result in a substantially clean, non-skid hard floor surface, including a grouted quarry tile floor, using either a stripping protocol, a maintenance protocol or a stripping-maintenance floor cleaning protocol.

BRIEF DISCUSSION OF THE INVENTION

We have found a step-wise cleaning protocol that can be used either in a stripping protocol, a stripping-maintenance protocol or in a simple maintenance protocol that is successful in removing substantially greater proportions of complex, difficult to remove, soils from hard floor surfaces, preferably grouted quarry tile surfaces. The protocol comprises a sequence of cleaners used to remove soil from a grouted quarry tile surface even from a recessed grout line. The protocol we have discovered, when compared to either a neutral cleaner alone, or a substantially acidic cleaner alone or a basic cleaner alone, increases soil removal on hard floor surfaces, resulting in substantially cleaned non-slip grouted quarry tile surfaces and significantly improved soil removal from grout lines. The protocol involves a first cleaning step using a first aqueous cleaner, with a pH departing from neutral (by at least 0.5 pH unit), followed by a pH complementary cleaner. The term "complementary pH" or "pH complementary" when compared to a basic pH refers to a pH less than about 6.5. When compared to an acid pH, a complementary pH is a pH greater than about 7.5.

In a first aspect, the cleaning protocol comprises a first addition of a basic cleaner (i.e., a cleaning composition having a pH greater than about 7.5), followed by the application of a complementary acidic cleaner (a cleaning composition having a pH less than about 6.5).

In a second aspect, the cleaning protocol comprises a first addition of an acidic cleaner (i.e., a cleaning composition having a pH less than about 6.5), followed by the application of a complementary basic cleaner (a cleaning composition having a pH greater than 7.5).

During contact between the initial cleaner and the quarry tile surface soil or grout line soil, the soil can be the subject of substantial mechanical force to promote soil removal.

Such mechanical force can be applied using a variety of abrasion devices including mechanical rotary scrubbers, sand blast, water blast, abrasive pads, brush scrubbing, etc. We have found this unique sequence, initial cleaner (either acidic or basic) followed by a second cleaner with a complementary pH (either basic or acidic), obtains a cleaning result substantially improved over any other cleaning protocol. The cleaning results of these protocols can be enhanced in certain soils using a neutral cleaner, preferably comprising a nonionic surfactant. Furthermore, the preferred protocol for any arbitrary soil and surface can include repeated application of the first cleaner - second pH complementary cleaner sequence, can use mechanical soil removal, or any other conventional step. We further found that the preferred sequence, basic cleaner followed by acidic cleaner, provides optimal performance.

Figure 1:
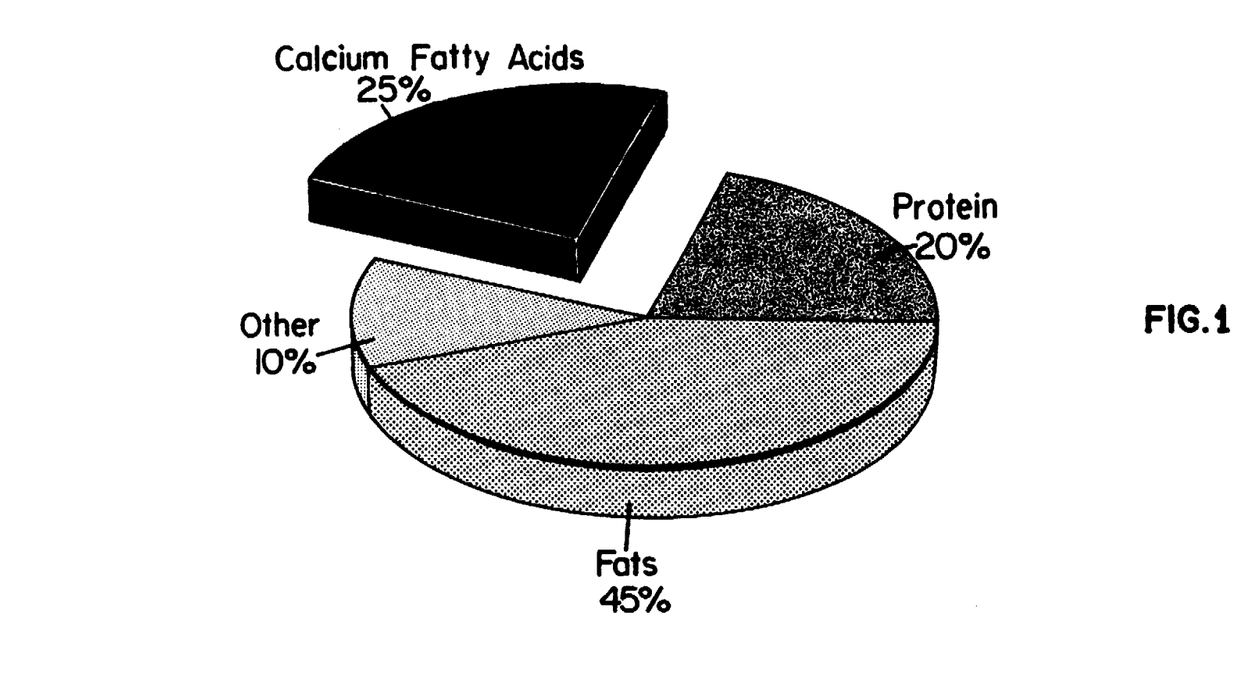
FIG. 1 is a pie chart depiction of a complex soil found in many locations comprising neutral fat, protein, insoluble calcium salts of saturated and unsaturated fatty acid in combination with a substantial proportion of other components.

For the purpose of this application, the term "complex soil" refers to a soil, formed on a hard floor surface such as a grouted quarry tile floor, comprising a mixture of at least two components selected from the group consisting of a proteinaceous soil; a carbohydrate soil; soil derived from hardness components or cleaning materials or both; or a fatty soil comprising free fatty acids or fatty acid salts of sodium, calcium, magnesium, etc., or neutral fats; or mixtures thereof. FIG. 1 shows a typical complex soil that is resistant to most current cleaners. A "hard floor surface" comprises any flooring commonly used in institutional, hospitality or industrial food preparation units. Such floor surfaces can comprise stone floors, quarry tile floors, ceramic tile floors, concrete floors (with expansion joints), asphalt tile, asbestos tile, linoleum flooring, mosaic floors, etc. The term "mechanical force", as it is used in the application and claims, refers to any force that is applied to either a surface or a soil residue in a preferred soil removing direction at an angle designed to abrade the surface of the soil or to separate or remove the soil from the hard floor surface. Such a mechanical force can operate in a peel mode, a shear mode or in an abrasive mode. The abrasive mode removes soil in the form of small particles by abrading the surface of the soil. A peel mode can act by inserting a separating force between the soil and the floor surface or the grout line surface. A shear mode can displace soils at an angle perpendicular to the floor or grout surface. Mechanical force can be applied using mechanical rotary scrubbers, abrasive brushes, abrasive pads, instruments having sharp edges, mechanically driven circular cleaning brushes or pads, abrasives in cleaning materials, mops, string mops, deck brushes, etc. The term "substantially complete" soil removal connotes a cleaned floor surface aesthetically acceptable to the floor owner. A cleaned floor can be defined as having less than 35%, preferably less than 15%, most preferably less than 5% of an original complex soil load after cleaning as measured by Fourier Transform Infrared analysis. Cleanlynewss can also be characterized by a coefficient of friction (COF as measured by ASTM C-1028 USING A BRUNGRABER MACHINE) that reduces the likelihood of a slip and fall accident. Typically the minimum COF is 0.4, preferably 0.5. Further, substantially complete soil removal also connotes the removal of substantial quantities of soil from grout lines resulting in a grout line having a substantially new looking appearance.

DETAILED DESCRIPTION OF THE INVENTION

The floor cleaning method of the invention resides in the unique sequence of a first cleaner followed by a second complementary pH cleaner in a cleaning protocol. The unique sequence of a first cleaner followed by a second complementary cleaner results in substantially complete soil removal. The unique cleaner sequence application can be part of a multi-step protocol accompanied by the application of mechanical soil removal force can remove soils even from recessed grout lines where soils that are resistant to cleaning can accumulate. In the multi-step protocol the unique sequence of a first cleaner followed by a pH complementary cleaner as described above, can be two steps of a cleaning protocol also comprising the use of floor preparation steps such as sweeping or rinsing, the use of a neutral cleaner, aqueous rinses, mechanical scrubbing steps, multiple sequence steps (the repetition of the first cleaner followed by the complementary cleaner), etc. The initial sweeping step can be used to remove loose soil or to begin soil abrasion. The first aqueous or neutral rinse or detergent wash can be used to remove loosely held soils loosened or partially removed by a sweeping step. The first cleaner followed by the complementary pH cleaner can be used once or in two or more applications. This can be followed by or combined with other conventional cleaning steps.

A preferred cleaning method of the invention can also comprise a first application of first cleaner followed by the application of mechanical force to the soils contacted and loosened by the first cleaner. The thus treated soils can then be contacted by complementary pH cleaner followed by mechanical soil removing action to result in substantially complete cleaning.

Figure 2:
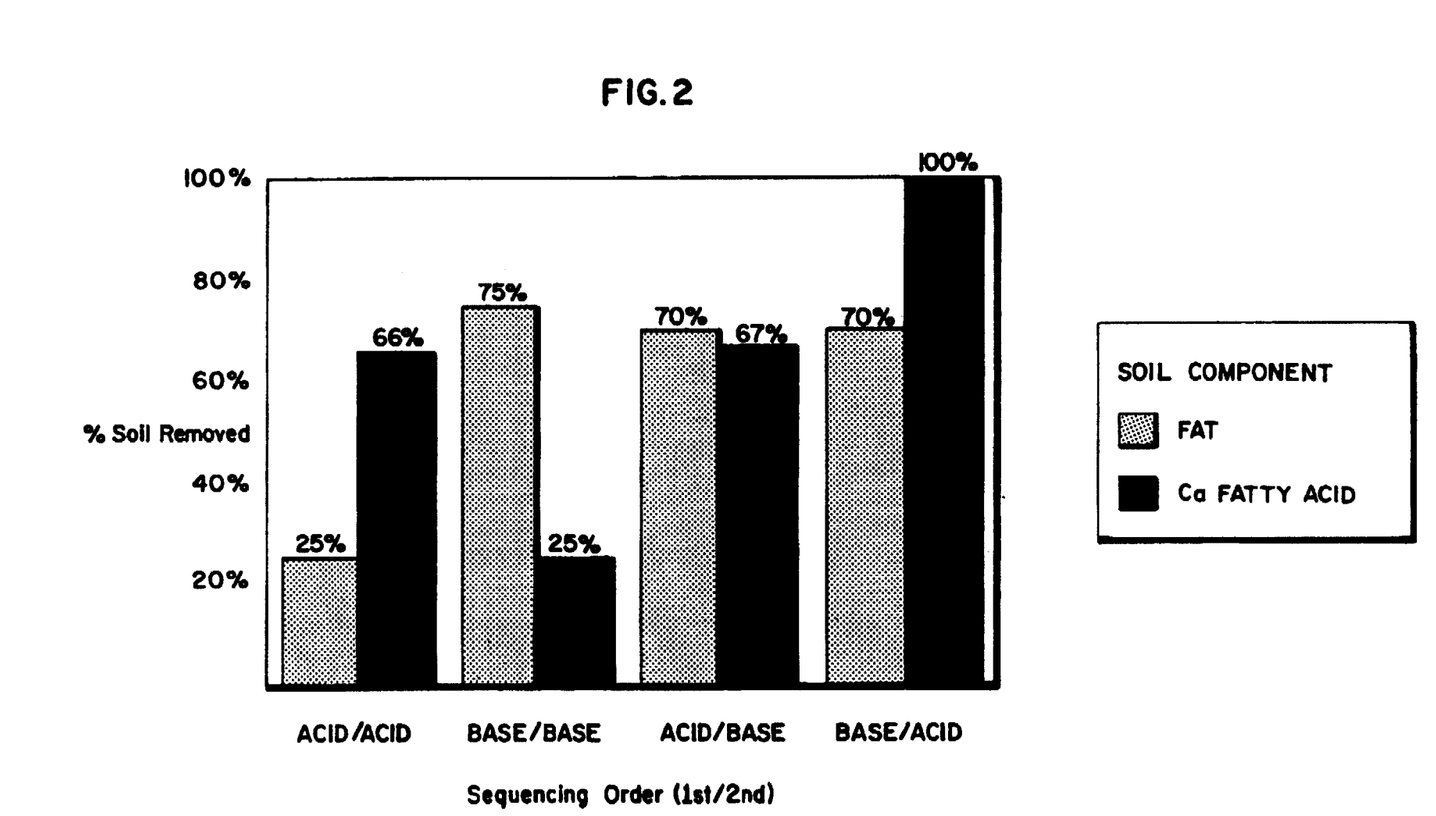
FIG. 2 is a bar graph displaying data derived from a FTIR (Fourier Transform Infrared Spectrum) analysis of soil removal testing. The product sequencing shows improved soil removal using a first cleaner followed by a complementary pH cleaner.
Figure 3:
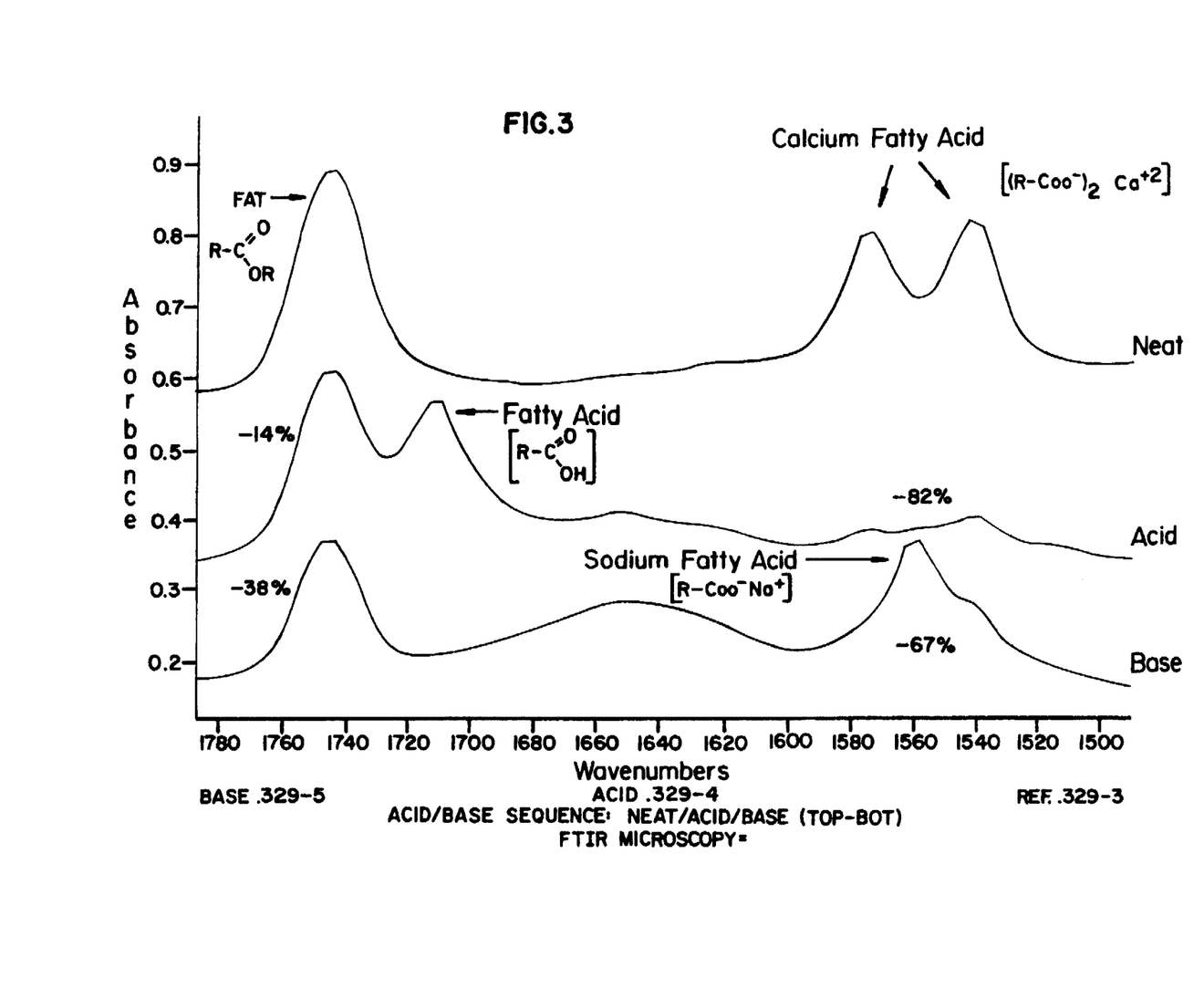
FIGS. 3 and 4 are FTIR spectra of soil in a silica cell showing substantial removal of soil based on a sequencing protocol. Similar results can be obtained using a soiled tile using standard methods.
Figure 4:
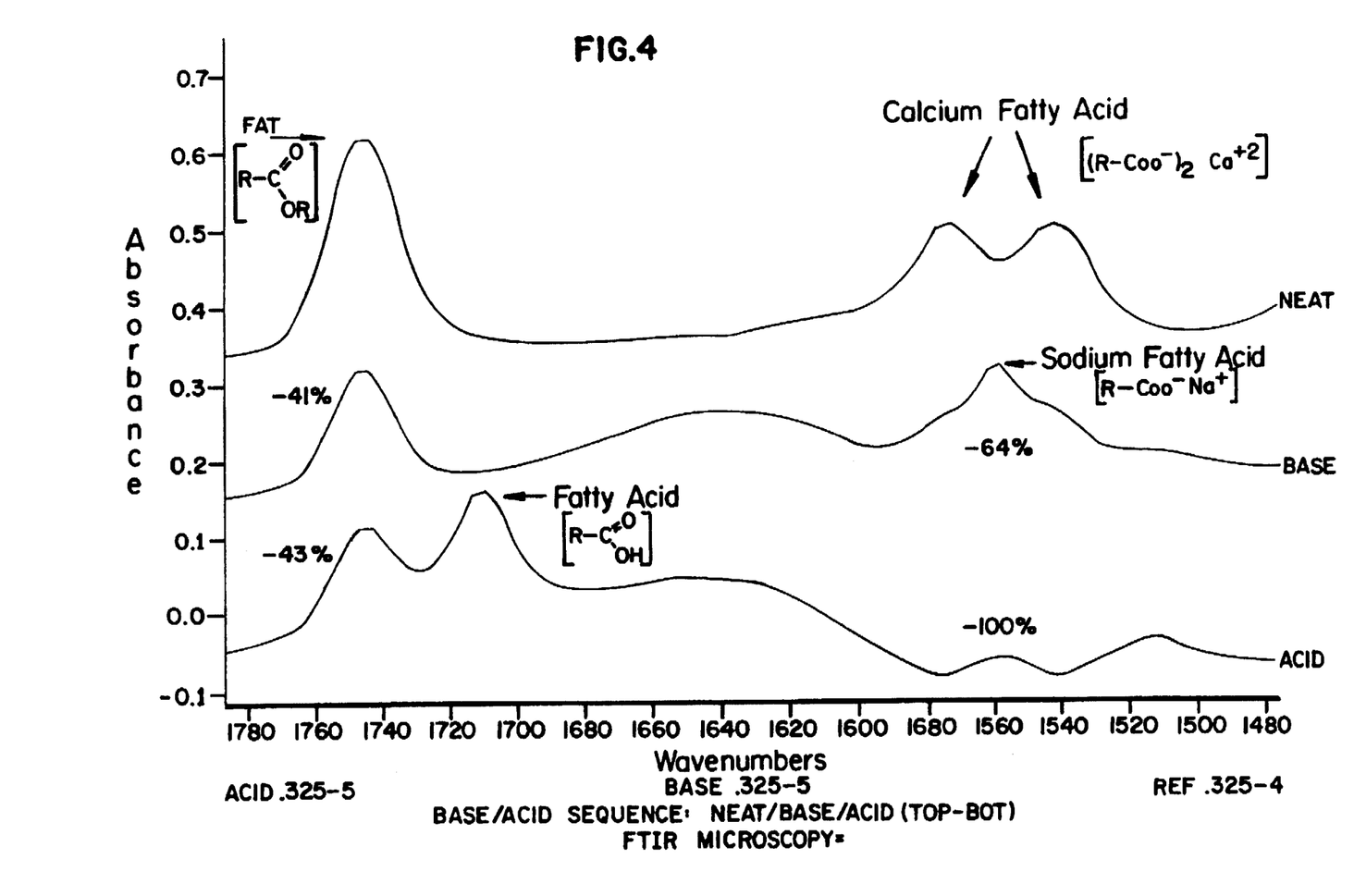

FIG. 2 is a bar chart showing soil removal testing of product sequencing protocols. In the bar charts labeled Acid/Acid and Base/Base, the protocols show that either the calcium fatty acid or the generally neutral fatty component is poorly removed in a single pH two step cleaning protocol involving an acid/acid or a base/base sequence. However, using an acid/base or a preferred base/acid testing protocol, the majority of both soil types are removed. In the base/acid product sequence, 70% of fat and all calcium fatty acid material (particularly resistant in prior art cleaning protocols) is removed by the preferred sequences. Similarly, FIGS. 3 and 4 show Fourier Transform Infrared Spectrum of soiled quarry tile surfaces cleaned using the acid/base or base/acid cleaning protocols of the invention. The FTIR spectrum are labeled to show peaks attributed to neutral fat or to calcium fatty acid salts. The spectrum clearly shows the substantial removal of these soil types using the product sequencing protocols.

Alkaline Hard Surface Cleaner

Alkaline cleaners useful in this invention can be formulated according to the following non-inclusive table.

Alkaline Surface Cleaner Components (wt %)

| Ingredient | Most Preferred | Preferred | Useful |
|---|---|---|---|
| Buffering Agent | 12–18 | 10–20 | 0–20 |
| Mild Alkalinity or Ammonium Source | 8–12 | 5–15 | 0–25 |
| Caustic or Alkalinity Source | 8–12 | 5–15 | 0–25 |
| Inorganic Sequestering Agent | 5–15 | 5–20 | 0–10 |
| Anionic Surfactant | 10–20 | — | 1–25 |
| Nonionic Surfactant | 10–15 | — | 0–25 |
| Organic Sequestering Agent | 10–20 | — | 0–25 |
| Solvent | 0.1–10 | 0.1–15 | 0–20 |

The hard surface cleaner can comprise a buffering agent. Basic buffering agents include a base and the salt of a complementary acid such. Such bases include, but are not limited to, the following: sodium bicarbonate, mixtures of sodium bicarbonate and sodium carbonate, disodium phosphate, trisodium phosphate, monosodium phosphate, mixtures of disodium phosphate and trisodium phosphate, borates such as sodium tetraborate and borax, and combinations of carbonates and phosphates. Suitable combinations of carbonates and phosphates have a weight ratio about 1:1 resulting in a pH of about 9–10.

The hard surface cleaner can comprise a mild alkalinity or ammonium source, preferably about 1–20.0 wt-%. Suitable sources include but are not limited to the following: ammonium hydroxide, ammonium bicarbonate, ammonium phosphate, diammonium phosphate, monoethanol amine, a mixture of ammonium chloride and sodium carbonate, disodium phosphate, trisodium phosphate, monosodium phosphate, mixtures of disodium phosphate and trisodium phosphate, borates such as sodium tetraborate and borax, and combinations of carbonates and phosphates. Suitable combinations of carbonates and phosphates have a weight ratio about 1:1 resulting in a pH of about 9–10. The alkalinity and ammonium source provides a source of mild alkalinity and also serves as a source of ammonia which increases customer satisfaction. The composition can also comprise about 8.0–12.0 wt-% of a caustic alkalinity source, preferably about 10.0 wt-%. Suitable alkalinity sources include but are not limited to the following: sodium hydroxide, potassium hydroxide, alkali metal silicate, etc. Preferred cleaners can comprise a caustic source, or a mild alkaline source or mixtures thereof.

The composition can also comprise an organic or inorganic sequestering agent, preferably about 1 wt-% to 15.0 wt-%. Suitable sequestering agents include alkali metal phosphates, polyphosphates, metaphosphates, and the like. Preferably the sequestering agent comprises a sodium tripolyphosphate bead. Organic sequestering include aminopolycarboxylic acids such as ethylenediamine tetraacetic acid hydroxy carboxylic acids such as gluconic, citric, tartaric, and gamma-hydroxybutyric acid, etc.

The hard surface cleaner can also comprise an anionic surfactant, preferably about 25 wt-%. Suitable anionic surfactants include but are not limited to the following sodium dodecyl benzene sulfonate, sodium lauryl sulfate or other anionic surfactants. Preferably the anionic surfactant comprises sodium dodecyl benzene sulfonate for cost reasons.

A solvent or cosolvent can be used to maintain the stability of the alkaline cleaners of this invention. Any solvent miscible in water that can maintain a stable solution of surfactant and acid in aqueous media can be used. Preferred cosolvents are alcohols and the mono and di-alkyl ethers of alkylene glycols, dialkylene glycols, trialkylene glycols, etc. Alcohols which are useful as cosolvents in this invention include methanol, ethanol, propanol and isopropanol. Particularly useful in this invention are the mono and dialkyl ethers of ethylene glycol and diethylene glycol, which have acquired trivial names such as polyglymes, cellosolves, and carbitols. Representative examples of this class of cosolvent include methyl cellosolves, butyl carbitol, dibutyl carbitol, diglyme, triglyme, etc. For reasons of low cost, commercial availability, and solvent strength, a $C_2$–$C_6$ alkyl carbitol is preferred. The most preferred cosolvent of this invention comprises butyl carbitol. These preferred cosolvents help reduce surface tension, help solubilize grease, and maintain the foamable, acidic cleaner as a stable single phase system.

The hard surface cleaner can also comprise a nonionic surfactant preferably about 15.0 wt-%. Suitable nonionic surfactants include but are not limited to the following fatty alcohol ethoxylates which are the reaction products of alkyl phenols such as nonyl phenol and octyl phenol with ethylene oxide. The preferred nonionic surfactants include octyl and nonyl phenol with 7–10 moles ethylene oxide. Other surfactants, discussed below in the section relating to the alkaline cleaners can be used.

The alkaline compositions of the invention can be formulated by any convenient means. The components can be dissolved or suspended or dispersed in an aqueous medium and agitated until a uniform aqueous composition is obtained. Generally, the order of addition of components is not critical; however, for use of manufacture and initial cleaner stability, the inorganic components of the alkaline cleaner can be added to the aqueous solution first followed by the organic components with the surfactant systems added last. The components are then blended into a final aqueous system having a final pH that ranges from about 6.5–13 or less at approximately 1% active concentration of alkaline components in soft water or in service or tap water. Preferably the pH of the final solution ranges between about 8 and 13 in a 1% aqueous solution of the cleaner in water.

Acidic Hard Surface Cleaners Acidic Surface Cleaner Components

| Ingredient | Most Preferred | Preferred | Useful |
|---|---|---|---|
| Buffering Agent | 12–18 | 10–20 | 0–20 |
| Mild or weak Acid | 8–20 | 5–45 | 0–50 |
| Strong Acid Source | 8–20 | 5–45 | 0–50 |
| Cationic Surfactant | 0–20 | 0–20 | 0–25 |
| Anionic Surfactant | 10–20 | — | 1–25 |
| Nonionic Surfactant | 10–15 | — | 0–25 |
| Organic Sequestering Agent | 0–20 | — | 0–25 |
| Solvent | 0.1–10 | 0.1–15 | 0–20 |

Briefly, the acidic hard surface cleaning compositions of the invention can comprise, in an aqueous solution or dispersion, an acidic component comprising a weak acid or a strong acid, or mixtures thereof, and a surfactant.

The acidic component used to prepare the acidic compositions of the invention will comprise an inorganic acid or an organic acid which can be dissolved in the aqueous system of the invention to produce an acidic pH in the range of about 1 to 6.5. A pH substantially less than about 1 can result in substantial corrosion of metal and other surfaces common in the cleaning environment, while a pH greater than about 6.5 can unacceptably reduce the cleaning efficiency of the composition.

Either a strong or a weak acid can be used in the acid cleaner compositions of the invention. Typical strong acids that can be used include sulfuric acid, hydrochloric acid, trichloroacetic acid, trifluoroacetic acid and others. The term "weak" as used in reference to an acidic component is intended to refer to an acid in which the first dissociation step does not proceed essentially to completion when the acid is dissolved in water at ambient temperatures at a concentration within a range useful to form the present compositions. Such inorganic and organic acids are also referred to as weak electrolytes as the term is used in *Textbook of Quantitative Inorganic Analysis*, I. M. Kolthoff et al., eds., The Macmillan Co. (3d ed., 1952) at pages 34–37, the disclosure of which is incorporated by reference herein.

Most common commercially-available weak inorganic and organic acids can be used in the invention. Useful weak inorganic acids include adipic acid, succinic acid, glutonic acid, phosphoric acid, sulfamic acid, acetic acid, hydroxyacetic acid, gluconic acid, gamma-hydroxybutyric acid, hydroxyacetic acid, citric acid, oxalic acid, malic acid, gluconic acid, benzoic acid, hydroxybenzoic acid, tartaric acid and the like. We have found that one type of difficult soil to remove from surfaces appears to be $CaHPO_4$ in combination with fatty acids and fat. This component is part of many soils and can be a result of the interaction between hardness components and acid-containing cleaners using phosphoric acid as the acidic component. We believe this soil is efficiently removed by the protocols of the invention.

We have found that a variety of anionic or nonionic surfactants can be used in the acid cleaner compositions of the invention. Anionic surfactants include sulfates, sulfonates, phosphates, phosphonates, carboxylates, etc. Preferred anionic surfactants include linear alkyl sulfates and sulfonates, linear alkyl benzene sulfates and sulfonates and related surfactants.

A large variety of nonionic surfactants can be used. These surfactants include block copolymers comprising large blocks of ethylene oxide (EO) and propylene oxide (PO). Such surfactants can also include large hydrophilic moieties such as alkyl groups, alkyl phenyl groups, fatty acid groups, etc. As a result, such surfactants generally can comprise a relatively hydrophilic portion with a relatively hydrophobic portion to result in a useful surfactant molecule. Examples of such useful surfactants include the condensation products of ethylene oxide with a hydrophobic polyoxyalkylene base formed by the condensation of propylene oxide with propylene glycol (the Pluronic® series, BASF Wyandotte), the reversed Pluronic®, alcohol ethoxylates, nonyl phenol ethoxylates, etc. One particularly useful surfactant for use in acid systems include the amine oxide surfactants. Useful amine oxide surfactants have the formula:

wherein $R_1$ is a $C_8$–$C_{20}$-alkyl or $C_8$–$C_{20}$-alkylamido-$C_2$–$C_5$-alkyl group and $R_2$ and $R_3$ are individually $C_1$–$C_4$-lower alkyl or hydroxy-$C_1$–$C_4$-lower alkyl. Preferably $R_2$ and $R_3$ are both methyl, ethyl or 2-hydroxyethyl. Preferred members of this class include lauryl(dimethyl)amine oxide (Ninox® L, Stephan Chemical Co., Northfield, Ill.), cocodimethyl amine oxide (Ninox® C), myristyl(dimethyl) amine oxide (Ninox® M), stearyl(dimethyl)amine oxide (Schercamox® DMS, Scher Chemicals, Inc., Clifton, N.J.), coco(bixhydroxyethyl)amine oxide (Schercamox® CMS), tallow(bis-hydroxyethyl)amine oxide and cocoamidopropyl (dimethyl)amine oxide (Ninox® CA). Although in alkaline solutions these surfactants are nonionic, in acidic solutions they adopt cationic characteristics. Preferably, the amine oxide surfactants will comprise about 1–15% of the present compositions, most preferably about 2–10%

Minor amounts of nonionic surfactants may also be included in the present compositions to augment the soil dispersal power of the amine oxide, but such surfactants will commonly not exceed 25% of the total surfactant present. Useful nonionic surfactants include the polyethyleneoxy condensates of $C_1$–$C_{10}$-alkyl-substituted phenols, e.g. the condensation products of 8–10 moles of ethylene oxide with nonylphenol (Igepal® 610, 630 and 710, respectively, available from GAF). Other useful nonionic surfactants include the condensation products of ethylene oxide with a hydrophobic polyoxyalkylene base formed by the condensation of propylene oxide with propylene glycol (such as the Pluronic® series, BASF Wyandotte), the condensation products of $C_8$–$C_{22}$-alkyl alcohols with 2–50 moles of ethylene oxide per mole of alcohol, the ethylene oxide esters of alkyl mercaptans, the ethylene oxide esters of fatty acids, the ethylene oxide ethers of fatty acid amides and other similar materials. When present, nonionic surfactants will preferably comprise about 0.25–3% of the total composition, most preferably about 0.5–1.5%.

A cosolvent can be used to maintain the stability of the acidic cleaners of this invention. Any solvent miscible in water that can maintain a stable solution of surfactant and acid in aqueous media can be used. Preferred cosolvents are alcohols and the mono and di-alkyl ethers of alkylene glycols, dialkylene glycols, trialkylene glycols, etc. Alcohols which are useful as cosolvents in this invention include methanol, ethanol, propanol and isopropanol. Particularly useful in this invention are the mono and dialkyl ethers of ethylene glycol and diethylene glycol, which have acquired trivial names such as polyglymes, cellosolves, and carbitols. Representative examples of this class of cosolvent include methyl cellosolves, butyl carbitol, dibutyl carbitol, diglyme, triglyme, etc. For reasons of low cost, commercial availability, and solvent strength, a $C_2$–$C_6$ alkyl carbitol is preferred. The most preferred cosolvent of this invention comprises butyl carbitol. These preferred cosolvents help reduce surface tension, help solubilize grease, and maintain the foamable, acidic cleaner as a stable single phase system.

Commonly the acid components are present in the cleaners in a total amount of from about 5 to 25 wt-% of the cleaner. At this concentration the preferred acidic components of the cleaner are highly efficient in the removal of hardness components at a low ingredient cost in combination with substantial user safety.

The total surfactants of the foamable, sprayable acidic cleaner of this invention can be present in a concentration of about 2 to about 15 wt-% of the composition. Preferably, for reasons of high activity and reduced cost, the surfactants of the invention are present in the cleaner at concentrations of about 3 to about 12 wt-% most preferably about 2.5–6.5 wt-%. The amine oxide surfactants will make up the major portion of this amount, preferably comprising about 50–100% of the total surfactant system, most preferably about 75–100%.

The cosolvent cleaner stabilizer component of the foamable acidic cleaner of the invention can be present in amounts ranging from about 1 to about 15 wt-% of the composition. Preferably, to aid in soil removal and to reduce surface tension, a cosolvent comprising an ethylene glycol mono or dialkyl ether is used at a concentration of about 2.5 to 10 wt-%. The most preferred cosolvent for use in the pumpable, foamable acidic cleaner of the invention comprises a $C_2$–$C_5$ alkyl carbitol, which is used at a concentration of about 2.5–5 wt-%. Minor but effective amounts of an acid-stable thickener may be added, if desired, to improve the stability and cling of the foamed composition. Useful thickeners include xanthan gum (Kelzan®, Merck) and polyvinylpyrrolidone. When employed, such thickeners will commonly be present at about 0.1–5% by weight of the composition.

The acidic compositions of this invention can be formulated by any convenient means. The composition can be a solid block, a cast solid, a pellet, a granule or agglomerate, a liquid or gel. The components can be dissolved or suspended in water and agitated until a solution is obtained. Generally, the order of addition of components is not important; however, for reasons of ease of manufacture and initial cleaner stability, the acidic components are dissolved in the water phase, then the cosolvent can be added, and finally, the amine oxide-comprising surfactant composition is added to the agitated, uniform mixture. The components are then blended in the aqueous system to provide a final pH that ranges from about 1 to about 5 at a 1% concentration of the cleaner in soft water or in service or tap water. Preferably, the pH of the final solution ranges between 1.5 and 3 in a 1% solution of the cleaner in service or tap water, and most preferably the pH of the final cleaning solution ranges from about 2 to 3.

The alkaline cleaning compositions and the acid cleaning composition can take a variety of formats. The product formats can include liquid products, thickened liquid products, gelled liquid products, granular and pelletized solid compositions, solid block compositions, cast solid block compositions and others. Liquid compositions can typically be made by forming the ingredients in an aqueous liquid or aqueous liquid solvent system. Such systems are typically made by dissolving or suspending the active ingredients in water or in compatible solvent and then diluting the product to an appropriate concentration, either to form a concentrate or a use solution thereof. Gelled compositions can be made similarly by dissolving or suspending the active ingredients in a compatible aqueous, aqueous liquid or mixed aqueous organic system including a gelling agent at an appropriate concentration. Solid particulate materials can be made by merely blending the dry solid ingredients in appropriate ratios or agglomerating the materials in appropriate agglomeration systems. Pelletized materials can be manufactured by compressing the solid granular or agglomerated materials in appropriate pelletizing equipment to result in appropriately sized pelletized materials. Solid block and cast solid block materials can be made by introducing into a container either a prehardened block of material or a castable liquid that hardens into a solid block within a container. Preferred containers include disposable plastic containers or water soluble film containers. Typically, solid block compositions are dispensed by spraying onto the solid composition, a dispensing water spray that creates a concentrate material that can be then transferred to a container for final dilution to a use concentration.

Preferred dispensing apparatus for use with the preferred product sequences of the invention can comprise a dispenser adapted to dispensing two, three or more cleaning compositions to a use locus. Such dispensing systems preferably include a plurality of individual use solution dispensers mounted within a housing and controlled by a control system. Two, three or more individual product dispensers can be incorporated into a single dispensing system. Each dispenser is preferably connected to a common diluent inlet through control components. The output from each dispenser unit is in fluid communication with a common outlet which can be preferably connected to a tube or other member to conduct the fluid product concentrate to a desired use locus or point of use, such as an automatic floor cleaning machine, mop bucket, spray head or other useful equipment. Each individual product dispenser for use in dispensing, for example, a neutral cleaner, an acidic cleaner or a basic cleaner typically comprises a source of pressurized water at a predetermined temperature. The solid concentrate in the form of a cast solid briquette or agglomerated chemical is dispensed by directing a high pressure stream, typically water, onto the material. The water delivery system includes a control valve which controls the entrance of water into the dispenser and controls the flow and the amount of water creating a fixed amount of liquid concentrate directed to the output of the dispenser. Appropriate control means for controlling the amount of water directed to the product concentrate can be used. A preferred multiple product dispensing system including dispenser for forming use solutions from solid chemical compositions is disclosed in U.S. Ser. No. 08/349,917, filed 6 Dec. 1994, now U.S. Pat. No. 5,494,644.

In the application of any cleaner composition disclosed, including the cleaner having a pH greater than 7.5 preferably greater than 8 and a cleaner having a pH less than 6.5 preferably less than 5.5, the cleaner is applied in a typical sequence of applying the cleaner to a hard floor surface, applying mechanical force to the soil in contact with the cleaner on the floor surface, and then removing the cleaner and any removed soil. Such a removal can be obtained by a variety of methods. The cleaner and soil can be removed by mopping, by squeegeeing, by vacuum removal, water flood or rinse or combinations of methods. Prior to the application of the cleaner, the floor should be swept free of gross sweepable particulate soils. Further, a water rinse or neutral cleaner can be used to remove weakly bonded soil residue.

Typically, the cleaner can be permitted to remain in contact with the soil and floor surface for a period of time before and after scrubbing to facilitate soil removal. A five to ten minute soaking step before or after the application of scrubbing or other mechanical force to the soil can promote soil removal.

A preferred device for scrubbing soil in contact with cleaners of the invention is a deck brush having strong pointed brush fibers that effectively and efficiently abrade and remove treated soil. The complete removal of the cleaner after soil removal has been optimized, is important. Any cleaner remaining on the floor, after drying, can simply redeposit, dissolved or suspended soils.

In the preferred cleaning protocols of the invention, the hard floor surface is contacted with a first cleaner followed by the application of a second complementary pH cleaner. The unique sequence of cleaners with complementary pH provides substantial soil removal and a cleaning protocol. Such a sequence can be one part of cleaning protocol including a number of other steps. The following table shows a variety of daily cleaning protocols. In the table preferred protocols defined by individual steps shown by single letter abbreviations which are defined in the table following the table of cleaning protocol sequences. Such protocols are used in one day's cleaning practice. The next day protocol can comprise another protocol depending on soil type and amount and day of the week.

TABLE

Daily Cleaning Protocols

|     |   |   |   |    |   |    |   |    |    |
| --- | - | - | - | -- | - | -- | - | -- | -- |
| 1.  | S |   | A | Sc | B |    |   |    | R  |
| 2.  |   | W |   | A  | B | A  | B |    |    |
| 3.  | S |   | B | Sc | A | Sc |   |    | R  |
| 4.  |   | W | B | Sc | A | Sc | B | A  | R  |
| 5.  | S | W | A | Sc | B |    |   | Re | R  |
| 6.  | S | W | B | Sc | A |    |   |    | R  |
| 7.  | S |   |   | A  | B | W  | A | B  | R  |
| 8.  | S |   |   | A  | B | A  | W | B  |    |
| 9.  | S |   |   | A  | B | A  | W | Re | R  |
| 10. | S | W |   | B  | Sc | A | B | W  | Re R |
| 11. | S |   |   |    | B | Sc | A |    | Re R |

S = Sweep
W = Wash With Aqueous Neutral Cleaner
A¹ = Wash With Acid Cleaner
B = Wash With Basic Cleaner
Re = Remove Cleaner
R = Plain Water Rinse
Sc = Scrub or Scrape
¹Any A or B step can include a scrubbing or soaking step.

TABLE

Weekly Cleaning Protocols

| Sun | Mon | Tue | Wed | Th | Fri | Sat |
| --- | --- | --- | --- | -- | --- | --- |
| A   | N   | N   | N   | N  | N   | B   |
| B/A | N   | N   | B/A | N  | A/B | N   |
| B   | A   | N   | B   | A  | N   | B/A |
| A   | B   | N   | A   | B  | N   | A/B |
| B   | A   | N   | B   | A  | N   | B   |
| B   | A   | B   | A   | B  | A   | B   |

N = Neutral or Nonionic Cleaner
A = Acid Cleaner
B = Basic Cleaner
A/B = Acid cleaner followed by Basic cleaner
B/A = Basic cleaner followed by Acid cleaner In the weekly cleaning protocols shown in the above table, each day is shown as a day involving an application of either a neutral, an acid or a base cleaner or sequence A/B or B/A. That day is followed by the application of another cleaner. The product sequencing claimed in this application include the application of an acid cleaner followed by the application of a basic cleaner or the application of a basic cleaner followed by the application of an acid cleaner within the same week. The use of a neutral cleaner can be part of the cleaning protocol on any arbitrary day. During each day, the floor is typically swept free of loose soil, can be rinsed followed by the application of a cleaner material and abrasion or scrubbing. The scrubbing step can be followed by the removal of cleaner and loosened soil by vacuum removal, mopping, squeegee, or other removal steps. After removal, the floor is typically rinsed with water and permitted to dry to a clean non-skid surface. However rinsing is not required in many cleaning loci.

In the methods of this invention, the degree of soil removal can be substantially increased by applying a mechanical force to the soil or to the floor surface. Such mechanical force can abrade the soil or can remove the soil from the surface of the floor tile in a peel or shear type mode. Mechanical force can be applied using a variety of application modes. First, the floor can be scraped using hard sharp edged instruments. Such cleaning is most effective in recessed grout lines, however, such implements can be used on floor surfaces. Additionally, abrasive mechanical force can be applied both to grout lines and to the quarry tile surface. Such abrasive force can be applied using brushes, abrasive pads, sand blast, water blast, abrasives in either the acidic or the alkaline cleaner system applied using any convenient application instrument such as a cloth, squeegee, etc. Such mechanical force can be applied using hand action or using a mechanical implement such as an electrically driven scrubber or brush. Such mechanically driven instruments can apply the force in a back and forth or circular manner depending on equipment design. We have also found that the use of the sequence of products results in substantial kill of microorganisms. We believe that under ordinary circumstances, the use of the cleaner sequence of the invention can result in a kill of a 3 $\log_{10}$ up to a 5 $\log_{10}$ of the original microbial population. We also believe, under optimized conditions that a sanitizing kill, greater than a 5 $\log_{10}$ kill in less than 30 seconds contact time, may be achievable.

Quantification of soil removal is well within the skill of the ordinary artisan involved in soil removal from hard surface floors. However, the following test protocol can be used (to supplement or replace the FTIR method or the COF method mentioned above) to quantify soil removal from hard floor surfaces, in particular, grouted quarry tile surfaces. The soil involved is one that can be ideal for measuring soil removal from hard surfaces or quarry tile surfaces. However, for measuring soil removal from grout lines, the soil and method is ideal.

Kitchen Floor Soil Gardner Straight Line Soil Removal Test Procedure

PURPOSE: To compare the cleaning efficiencies of various detergent formulations.

PRINCIPLE: Quarry floor tiles are baked at 200° F. for 2 hours with a soil mixture, such as a calcium fatty acid soil, that reproduces soil found on a restaurant kitchen floor. Tiles are then read on the UltraScan Spectrophotometer instrument before and after the test procedure.

The Gardner Straight Line Washability apparatus, Model WG 8100 is used to clean the soled tiles using a nylon brush (from Gardner), using use dilution concentrations of detergents.

APPARATUS AND MATERIALS:
1. Gardner Straight Line apparatus with plastic template, 21<sup>15</sup>⁄₁₆"×6<sup>15</sup>⁄₁₆"×½". Two holes 3<sup>1</sup>⁄₁₆"×3<sup>1</sup>⁄₁₆.
2. UltraScan Spectrophotometer instrument.
3. Cream, solid quarry tile, 3"×3" panels. Supplier: Color Tile, St. Paul, Minn.
4. Paint brush, 1" width (not nylon).
5. Gardner Straight Line brush (two brushes joined together 2¾" W×3½" L.
6. Balance.
7. Graduated cylinder (200 mls).
8. Oven (preheated to 200° F.).

TITLE SOILING PROCEDURE:
1. If using the UltraScan to obtain data, an initial reading of the tiles is needed. Read the smooth side of the quarry tiles (4 tiles for each product concentrated tested).
2. Mix the soil well before applying to the tile, maintaining the consistency of the soil that is needed to spread over the tile. Place tile on the balance and tare. Apply about 2.0 grams of soil and using the paint brush spread it over the surface stroking in one direction and then turn the tile and crisscross over the strokes.
Soil only enough tiles that will be needed for the test.
3. Place the files in the oven (preheated to 200° F.) and bake for 2 hours. Remove and let sit overnight (tiles should not be kept or used after 1 day).

SOIL REMOVAL TEST PROCEDURE:
1. Make up test solutions typically at 2 oz/gal (1.5 wt %) use the appropriate water for your testing. Once a water has been selected it should be used throughout the test.
2. Place the plastic template inside the Gardner Straight Line and place the brush into the housing box.
3. Place 2 soiled tiles into the template openings.
4. With the graduated cylinder pour 200 mls of the test solution into the tray.
5. Start the machine immediately, washing the tiles for 32 passes (rotate tile after every 8 passes).
6. Remove the brush and tiles and rinse them with warm water.
7. Air dry tiles.

RECORDING DATA (example):
Use appropriate Ultrascan machine set-up and record Ultrascan reading before (B) and after (A) cleaning soiled tile.
A=After
B=Before
CALCULATIONS:
(A-B)/(Initial:B)×100=CE
INTERPRETATION OF RESULTS:

To eliminate variations from one batch of soil to another and the variations in application from one tester to another, do not compare results for similar products unless tests are run on the same day with the same soil and the same person performing the test procedure. This is an empirical test good only for comparison purposes. Add to the test a product that has a known result as a comparison to all other detergents run during each testing run.

The Figures, specification, procedures and tables of this application provide a basis for understanding the meets and bounds of the invention. However, the invention can be embodied in a variety of useful procedures. The invention is embodied in the claims hereinafter appended.

We claim:
1. A method of cleaning a hard floor surface to substantially completely remove a complex soil, the method comprising the sequential steps of:
   (a) first contacting a hard floor surface having a complex soil residue with a first cleaner that has an alkaline pH, to result in a treated floor surface;
   (b) next contacting the treated floor surface with a second cleaner having an acidic pH; and then
   (c) contacting the floor surface with a third cleaner having a neutral pH, said third cleaner comprising a nonionic surfactant,
wherein the complex surface soil residue is exposed to mechanical force in the presence of a cleaner.

2. The method of claim 1 wherein exposure to mechanical force occurs with the first cleaner.

3. The method of claim 1 wherein exposure to mechanical force occurs with the cleaner having a complementary pH.

4. The method of claim 1 wherein after the floor is contacted with a cleaner, the cleaner is substantially removed from the floor.

5. The method of claim 1 wherein the floor surface is swept prior to contact with a cleaner.

6. The method of claim 1 wherein mechanical force comprises applying a cleaning force using a brush, a mechanical rotary scrubber, an abrasive pad, or combinations thereof.

7. The method of claim 1 wherein substantially complete soil removal from the hard surface is characterized by the hard surface having a coefficient of friction of greater than about 0.4.

8. The method of claim 1 further comprising a floor preparation step.

9. The method of claim 1 wherein each cleaner is applied on a different day within the same week.

10. A method of cleaning a hard grouted quarry tile floor surface to substantially completely remove a complex soil, the method comprising the sequential steps of:
 (a) first contacting a hard floor surface having a complex soil residue with a first cleaner that has an alkaline pH, to result in a treated floor surface;
 (b) next contacting the treated floor surface with a second cleaner having an acidic pH; and then
 (c) contacting the floor surface with a third cleaner having a neutral pH, said third cleaner comprising a nonionic surfactant,
wherein the complex surface soil residue is exposed to mechanical force in the presence of a cleaner.

11. The method of claim 10 wherein substantially complete soil removal is determined by Fourier Transform Infrared analysis.

12. The method of claim 10 wherein exposure to mechanical force occurs with the first cleaner.

13. The method of claim 10 wherein exposure to mechanical force occurs with the cleaner having an acidic pH.

14. The method of claim 10 wherein after the floor is contacted with a cleaner, the cleaner is substantially removed from the floor.

15. The method of claim 10 wherein the floor surface is swept prior to contact with the first cleaner.

16. The method of claim 10 wherein mechanical force comprises applying a cleaning force using a brush, a mechanical rotary scrubber, an abrasive pad, a deck brush, a mop or combinations thereof.

17. The method of claim 10 wherein substantially complete soil removal from the hard surface is characterized by the hard surface having a coefficient of friction of greater than about 0.4.

18. A method of cleaning a hard grouted quarry tile floor to substantially completely remove a complex soil, the method comprising the sequential steps of:
 (a) first contacting a hard floor surface having a complex soil residue with a first cleaner having a pH greater than about 8, to result in a treated floor surface;
 (b) next contacting the treated floor surface with a second cleaner having a pH less than about 6; and then
 (c) contacting the floor surface with a third cleaner having a neutral pH, said third cleaner comprising a nonionic surfactant,
wherein the complex surface soil residue is exposed to mechanical force in the presence of a cleaner.

19. The method of claim 18 wherein substantially complete soil removal is determined by Fourier Transform Infrared analysis.

20. The method of claim 18 wherein applying mechanical force occurs with an alkaline cleaner having a pH greater than about 8.

21. The method of claim 18 wherein applying mechanical force occurs with an acid cleaner having a pH less than 6.

22. The method of claim 18 wherein the cleaner having a pH greater than about 8 comprises an aqueous cleaner containing a source of alkalinity selected from the group consisting of sodium hydroxide, potassium hydroxide, a sodium silicate, a potassium silicate or mixtures thereof.

23. The method of claim 18 wherein the cleaner having a pH greater than about 8 comprises an aqueous cleaning composition comprising a source of alkalinity selected from the group consisting of an ammonium compound, ammonium hydroxide, monoethanol amine, an alkali metal carbonate, an alkali metal bicarbonate, an alkali metal oxides or mixtures thereof.

24. The method of claim 18 wherein the cleaner having a pH less than 6 comprises an aqueous cleaner containing an inorganic acid comprising phosphoric acid.

25. The method of claim 18 wherein the cleaner having a pH less than 6 comprises an aqueous cleaning composition comprising acetic acid, sulfamic acid, hydroxyacetic acid, or mixtures thereof.

26. The method of claim 18 wherein applying mechanical force comprises applying a cleaning force using a brush, or an abrasive pad.

27. The method of claim 18 wherein applying mechanical force comprises using an electrically driven rotary brush.

28. The method of claim 18 wherein after the floor is contacted with a cleaner, the cleaner is substantially removed from the floor.

29. The method of claim 18 wherein substantially complete soil removal from the hard surface is characterized by a coefficient of friction of greater than about 0.4.

30. A method of cleaning a grouted quarry tile floor to substantially completely remove a complex soil, the method comprising the sequential steps of:
 (a) first contacting a hard floor surface having a complex soil residue with a first cleaner having a pH less than about 7, to result in a treated floor surface;
 (b) next contacting the treated floor surface with a second cleaner having a pH greater than about 8; and then
 (c) contacting the floor surface with a third cleaner having a neutral pH, said third cleaner comprising a nonionic surfactant,
wherein the complex surface soil residue is exposed to mechanical force in the presence of a cleaner.

31. The method of claim 30 wherein applying mechanical force for soil removal occurs with an alkaline cleaner having a pH greater than about 8.

32. The method of claim 30 wherein applying mechanical force to the soil residue occurs with an alkaline cleaner having a pH greater than about 8.

33. The method of claim 30 wherein applying mechanical force to the soil residue occurs after containing the floor with an acid cleaner having a pH less than 7.

34. The method of claim 30 wherein the cleaner having a pH greater than about 8 comprises an aqueous cleaner containing a source of alkalinity selected from the group consisting of sodium hydroxide, potassium hydroxide or mixtures thereof.

35. The method of claim 30 wherein the cleaner having a pH greater than about 8 comprises an aqueous cleaning composition comprising a source of alkalinity selected from the group consisting of an ammonium compound, an alkali metal carbonate, an alkali metal bicarbonate, an alkali metal oxide or mixtures thereof.

36. The method of claim 30 wherein the cleaner having a pH less than 6 comprises an aqueous cleaner comprising an inorganic acid comprising phosphoric acid.

37. The method of claim 30 wherein the cleaner having a pH less than 6 comprises an aqueous cleaning composition comprising acetic acid, sulfamic acid, hydroxyacetic acid, citric acid or mixtures thereof.

38. The method of claim 30 wherein applying mechanical force comprises applying a cleaning force using a brush, or an abrasive pad.

39. The method of claim 30 wherein applying mechanical force comprises using an electrically driven rotary brush.

40. The method of claim 30 wherein substantially complete soil removal from the hard surface is characterized by a coefficient of friction of greater than about 0.5.

41. The method of claim 30 wherein the floor surface is swept prior to contact with the first cleaner.

42. The method of claim 30 wherein after the floor is contacted with a cleaner, the cleaner is substantially removed from the floor.

* * * * *

UNITED STATES PATENT AND TRADEMARK OFFICE
CERTIFICATE OF CORRECTION

PATENT NO. : 5,797,986
DATED : August 25, 1998
INVENTOR(S) : John J. Rolando et al.

It is certified that error appears in the above-identified patent and that said Letters Patent is hereby corrected as shown below:

In Column 16, line 20 claim 25, after "hydroxyacetic acid" insert therefor

--, citric-- .

Signed and Sealed this

Twelfth Day of January, 1999

Attest:

Attesting Officer

Acting Commissioner of Patents and Trademarks